US010437589B2

(12) United States Patent
Nakamoto et al.

(10) Patent No.: US 10,437,589 B2
(45) Date of Patent: Oct. 8, 2019

(54) DISTRIBUTED PROCESSING CONTROL SYSTEM AND DISTRIBUTED PROCESSING CONTROL METHOD

(71) Applicant: HONDA MOTOR CO., LTD., Tokyo (JP)

(72) Inventors: Go Nakamoto, Tokyo (JP); Shuichiro Shinkai, Tokyo (JP); Shuji Kikuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 278 days.

(21) Appl. No.: 15/598,557

(22) Filed: May 18, 2017

(65) Prior Publication Data

US 2017/0344365 A1    Nov. 30, 2017

(30) Foreign Application Priority Data

May 27, 2016   (JP) ................. 2016-106407

(51) Int. Cl.
| G06F 9/46 | (2006.01) |
| G06F 9/30 | (2018.01) |
| G06F 17/11 | (2006.01) |
| G06F 9/50 | (2006.01) |

(52) U.S. Cl.
CPC ........ G06F 9/3001 (2013.01); G06F 9/30043 (2013.01); G06F 9/5083 (2013.01); G06F 17/11 (2013.01)

(58) Field of Classification Search
None
See application file for complete search history.

(56) References Cited

U.S. PATENT DOCUMENTS

2012/0066684 A1 *   3/2012   Takami ................. G06F 9/5083
                                                                    718/102

FOREIGN PATENT DOCUMENTS

JP          2006-338264 A     12/2006

* cited by examiner

*Primary Examiner* — Gregory A Kessler
(74) *Attorney, Agent, or Firm* — Squire Patton Boggs (US) LLP

(57) ABSTRACT

The present invention provides a system capable of properly controlling the switching of the operation state of each of a plurality of arithmetic processing resources according to an increase or a decrease in an arithmetic processing load. A distributed processing control system 10 includes a load estimation unit 11 that estimates an estimation arithmetic processing load at a first point of time in a future from a reference point of time, and a state control unit 12 that starts the processing for switching the operation state of an arithmetic processing resource Sj so as to satisfy a first condition, in which the estimated arithmetic processing load is included in a predetermined range of an estimation processing capacity of the arithmetic processing resource Sj expected to be activated at the first point of time.

11 Claims, 5 Drawing Sheets

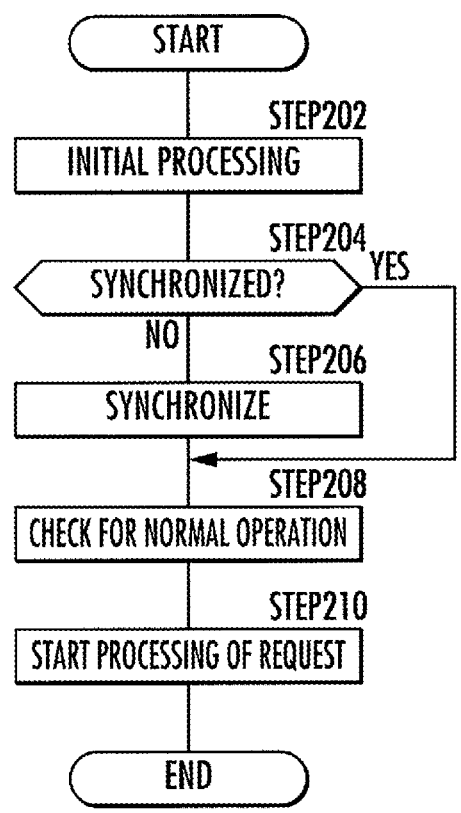

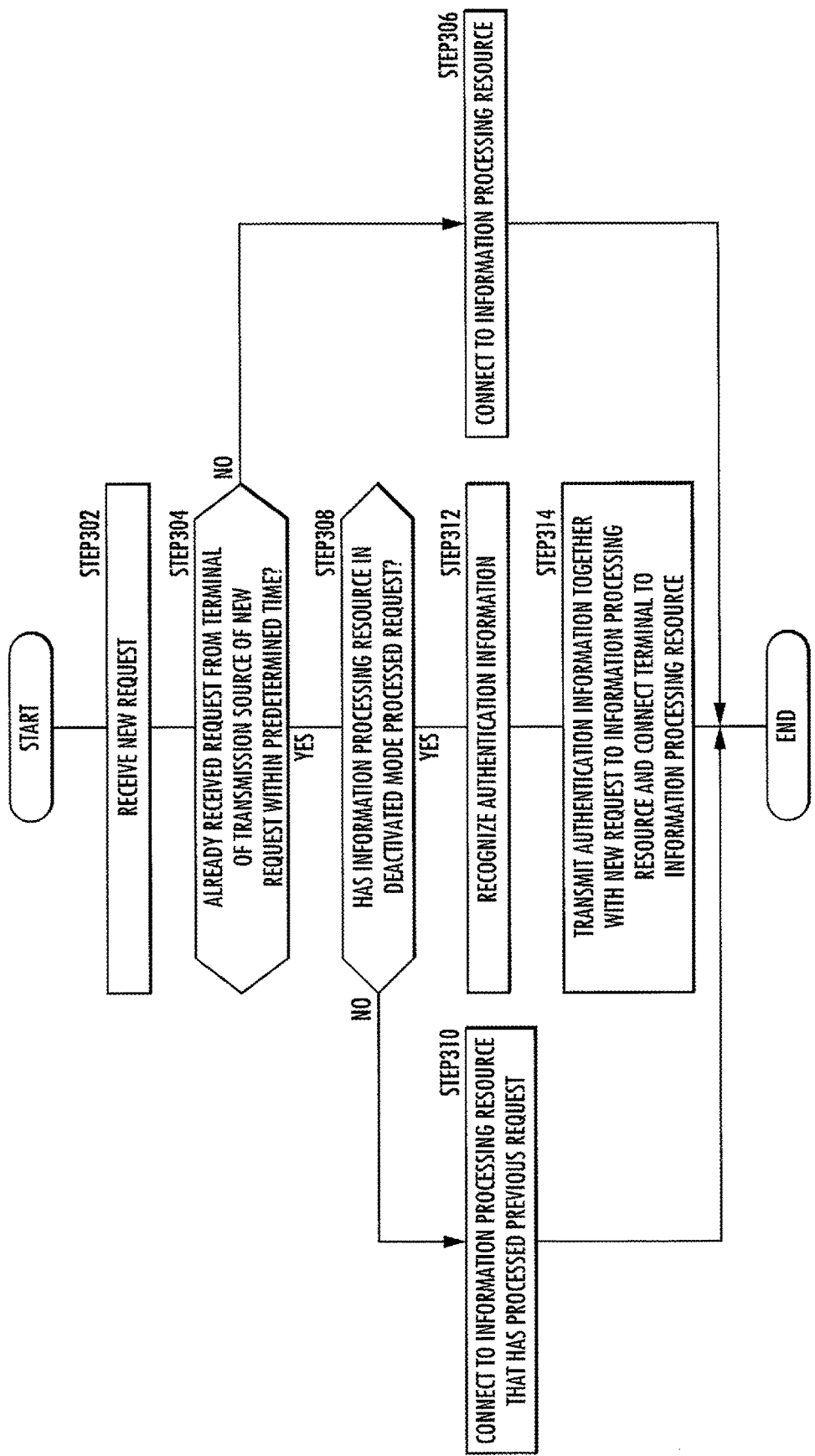

DISTRIBUTED PROCESSING CONTROL SYSTEM AND DISTRIBUTED PROCESSING CONTROL METHOD

BACKGROUND OF THE INVENTION

Field of the Invention

The present invention relates to a technique for controlling the switching of the operation state of each of a plurality of arithmetic processing resources constituting a distributed processing system, which are connected in a mutually communicable manner through a communication network.

Description of the Related Art

A technical method described below has been proposed (refer to Patent Document 1). In load distribution, if the load on a first virtual machine satisfies a first load condition, then a second virtual machine is placed. After the second virtual machine is placed, if the load on the first virtual machine satisfies the first load condition and the load on the second virtual machine satisfies a second load condition, then a third virtual machine is added. If the load on the second virtual machine does not satisfy the second load condition, then the addition of the third virtual machine is suspended.

Patent Document 1: Japanese Patent Application Laid-Open No. 2006-338264

However, according to the technical method described in Patent Document 1, there has been a risk that, if a load rapidly increases, the load will exceed the processing capacity of a virtual machine due to the time required for a virtual machine in a standby state to be switched to a state that enables the virtual machine to process the load.

On the other hand, if a sufficiently large number of virtual machines are operated in advance so as to be ready for processing a load at all times, then a considerable surplus occurs in the processing capacity for a load, possibly leading to waste.

SUMMARY OF THE INVENTION

In view of the background described above, an object of the present invention is to provide a system and a method that enable control for properly switching the operation state of each of a plurality of arithmetic processing resources in response to an increase or a decrease in an arithmetic processing load.

A distributed processing control system according to the present invention is a distributed processing control system that controls a switching of an operation state of each of a plurality of arithmetic processing resources that carry out arithmetic processing, including:

a load estimation element that estimates an estimation arithmetic processing load, which is an arithmetic processing load on all the plurality of arithmetic processing resources at a first point of time in a further from a reference point of time; and a state control element that starts a processing for switching the operation state of the arithmetic processing resources before the first point of time so as to satisfy a first condition, in which the estimation arithmetic processing load is included in a predetermined range of an estimation processing capacity of an arithmetic processing resource expected to be activated at the first point of time.

According to the distributed processing control system in accordance with the present invention, the processing for switching the operation state of an arithmetic processing resource is started such that the estimation arithmetic processing load will be included in the predetermined range of the estimation processing capacity of all the arithmetic processing resources expected to be activated at the first point of time. This makes it possible to control the processing for switching the operation state of each of the plurality of arithmetic processing resources according to an increase or a decrease in the arithmetic processing load.

Preferably, in the distributed processing control system according to the present invention, the first condition includes an estimation high load condition in which the estimation arithmetic processing load is equal to or less than an estimation high load threshold value, which is an upper limit value of the predetermined range, and the state control element is configured to determine the arithmetic processing resource expected to be activated by virtually adding an arithmetic processing resource to an arithmetic processing resource in an activated state until the estimation arithmetic processing load satisfies the estimation high load condition.

According to the distributed processing control system having the foregoing configuration, if the estimation arithmetic processing load exceeds the estimation high load threshold value, then an arithmetic processing resource is virtually added until the estimation high load condition is satisfied. With this arrangement, an arithmetic processing resource is properly selected to prevent the shortage or surplus of resources that process the arithmetic processing load at the first point of time.

Preferably, in the distributed processing control system according to the present invention, the state control element evaluates the estimation processing capacity of the virtually added arithmetic processing resource at the first point of time to be lower than a normal processing capacity, and the estimation high load condition is a condition in which the estimation arithmetic processing load per arithmetic processing resource is equal to or less than the estimation high load threshold value.

According to the distributed processing control system having the foregoing configuration, the estimation processing capacity of the virtually added arithmetic processing resource at the first point of time is evaluated to be lower than a normal processing capacity, and the operations of the arithmetic processing resources are controlled such that the estimation arithmetic processing load per arithmetic processing resource will be equal to or less than the estimation high load threshold value. With this arrangement, even if the processing capacity of an arithmetic processing resource decreases to be lower than a normal processing capacity immediately after an arithmetic processing resource is added, an arithmetic processing resource is added, taking the decrease in the processing capacity into consideration.

Preferably, in the distributed processing control system according to the present invention, the first condition includes an estimation low load condition in which the estimation arithmetic processing load is equal to or more than an estimation low load threshold value, which is a lower limit value of the predetermined range, and the state control element is configured to determine the arithmetic processing resource expected to be activated by virtually reducing the number of the arithmetic processing resources in the activated state until the estimation arithmetic processing load satisfies the estimation low load condition.

According to the distributed processing control system having the foregoing configuration, if the estimation arithmetic processing load is less than an estimation low load threshold value, then the number of the arithmetic processing resources is virtually reduced until the estimation low load condition is satisfied. With this arrangement, an arithmetic processing resource is properly selected to suppress the shortage or surplus of resources that process the arithmetic processing load at the first point of time.

Preferably, in the distributed processing control system according to the present invention, in a case where the number of the arithmetic processing resources expected to be activated at the first point of time is smaller than the number of the arithmetic processing resources in the activated state at the reference point of time, the state control element starts, by the first point of time, a processing for deactivating the arithmetic processing resources that are different from the arithmetic processing resources expected to be activated among the arithmetic processing resources in the activated state, and in a case where the number of the arithmetic processing resources expected to be activated at the first point of time is larger than the number of the arithmetic processing resources in the activated state at the reference point of time, the state control element starts, by the first point of time, a processing for activating the arithmetic processing resources in a deactivated state by a number equivalent to a difference between the number of the arithmetic processing resources expected to be activated at the first point of time and the number of the arithmetic processing resources in the activated state among the plurality of arithmetic processing resources.

According to the distributed processing control system having the foregoing configuration, in the case of surplus of the arithmetic processing resources, the arithmetic processing resources are deactivated, and in the case of shortage of the arithmetic processing resources, the processing for activating the arithmetic processing resources is started to add the arithmetic processing resources to the arithmetic processing resources in the activated state at the reference point of time. This makes it possible to start the processing for activating only necessary arithmetic processing resources, thus permitting a reduction in the cost for operating the arithmetic processing resources.

Preferably, in the distributed processing control system having the foregoing configuration, each of the plurality of arithmetic processing resources is an arithmetic processing resource that processes a request from an authenticated terminal, and the distributed processing control system is configured to:

acquire, from one arithmetic processing resource, data which is accumulated in the one arithmetic processing resource at a time of deactivating the one arithmetic processing resource among the plurality of arithmetic processing resources and which includes authentication information of the terminal, and include a data synchronization element that transmits the authentication information, which is included in the data, together with a second request to an arithmetic processing resource that is in the activated state or expected to be activated at a point of time of processing the second request in a case where the second request is newly received from a terminal that has accepted a first request within a predetermined time from the reference point of time and the arithmetic processing resource that has processed the first request is deactivated.

According to the distributed processing control system having the foregoing configuration, even if the arithmetic processing resource that has processed the first request is in the deactivated state, the authentication information included in the data synchronized when the arithmetic processing resource is deactivated is transmitted, together with the second request, to the arithmetic processing resource that is in the activated state or expected to be activated at the point of time of accepting the second request. This obviates the need for separately authenticating a terminal of the transmission source of the second request. Thus, the processing for the authentication can be omitted, permitting a reduction in arithmetic processing load.

Preferably, in the distributed processing control system according to the present invention, the state control element starts a processing for selecting an arithmetic processing resource that satisfies the first condition provided that a second condition is satisfied in that the estimation arithmetic processing load deviates from a predetermined range of the processing capacity of an arithmetic processing resource in the activated state at the reference point of time.

According to the distributed processing control system having the foregoing configuration, if the estimation arithmetic processing load deviates from the predetermined range of the processing capacity of the arithmetic processing resource in the activated state at the reference point of time, then the processing for selecting an arithmetic processing resource that satisfies the first condition is started. This makes it possible to reduce the arithmetic processing load of the distributed processing control system itself in the case where there is no need to switch the operation state of an arithmetic processing resource, as in the case where the estimation arithmetic processing load remains in the predetermined range of the processing capacity of the arithmetic processing resource in the activated state at the reference point of time.

Preferably, the distributed processing control system according to the present invention includes:

a storage element that stores a first changing mode, which is a time-series changing mode of a past arithmetic processing load for each of a plurality of element periods of time constituting a predetermined unit period of time, and the load estimation element is configured to measure a measurement arithmetic processing load, which is the arithmetic processing load at the reference point of time, and to estimate the estimation arithmetic processing load based on the measurement arithmetic processing load and the first changing mode in the element period of time corresponding to the reference point of time.

According to the distributed processing control system in accordance with the present invention, the estimation arithmetic processing load is estimated on the basis of the measurement arithmetic processing load and the first changing mode of the element period of time which is included in a past record of the distributed processing control system and which corresponds to the reference point of time, thus improving the estimation accuracy of an estimation arithmetic processing load.

Preferably, in the distributed processing control system according to the present invention, the load estimation element is configured to recognize a second changing mode, which is a time-series changing mode of an arithmetic processing load up to the reference point of time from a second point of time that is further in the past than the reference point of time, and to estimate the estimation arithmetic processing load on an assumption that a changing mode, a degree of approximation thereof to the second changing mode being a predetermined value or more, takes place during a period of time from the reference point of time to the first point of time.

According to the distributed processing control system in accordance with the present invention, the estimation arithmetic processing load is estimated, expecting that the same changing mode as the second changing mode that is actually occurring will take place. This improves the estimation accuracy of an estimation arithmetic processing load.

Preferably, the distributed processing control system according to the present invention includes:

a storage element that stores a third changing mode, which is a time-series changing mode of a past arithmetic processing load, wherein the load estimation element is configured to recognize a fourth changing mode, which is a time-series changing mode of an arithmetic processing load up to the reference point of time from a third point of time that is further in the past than the reference point of time, and to estimate the estimation arithmetic processing load based on the third changing mode, a degree of approximation thereof to the fourth changing mode being a predetermined value or more.

The distributed processing control system in accordance with the present invention estimates an estimation arithmetic processing load on the basis of the time-series changing mode of a past similar arithmetic processing load of the distributed processing control system, thus leading to improved estimation accuracy of the estimation arithmetic processing load.

In the distributed processing control system having the foregoing configuration, the load estimation element is configured to estimate the estimation arithmetic processing load on the basis of a third changing mode having freshness of a predetermined value or more among the third changing modes, the degrees of approximation thereof to the fourth changing mode being a predetermined value or more.

The distributed processing control system in accordance with the present invention estimates an estimation arithmetic processing load based on a changing mode having freshness of a predetermined value or more among the time-series changing modes of the arithmetic processing loads, the past degrees of approximation of the distributed processing control system being a predetermined value or more. This leads to further improved estimation accuracy of an estimation arithmetic processing load.

Preferably, in the distributed processing control systems described above, the load estimation element is configured to recognize a bias period of time, during which the arithmetic processing load is increased or decreased, and to recognize the estimation arithmetic processing load according to an amount of an increase or a decrease in the bias period of time in a case where the reference point of time is included in the bias period of time.

The distributed processing control system in accordance with the present invention recognizes an estimation arithmetic processing load, considering the amount of an increase or a decrease in the bias period of time during which an arithmetic processing load is increased or decreased. Therefore, even if adequate information regarding past arithmetic processing loads is not available, the estimation arithmetic processing load can be set to a proper value by taking into account the nature of a period of time.

BRIEF DESCRIPTION OF THE DRAWINGS

FIG. 4 is a flowchart of start processing; and

FIG. 5 is a flowchart of request acceptance processing.

DESCRIPTION OF THE PREFERRED EMBODIMENTS

Referring to FIG. 1 to FIG. 5, an embodiment of the present invention will be described.

(Configuration)

Figure 1:
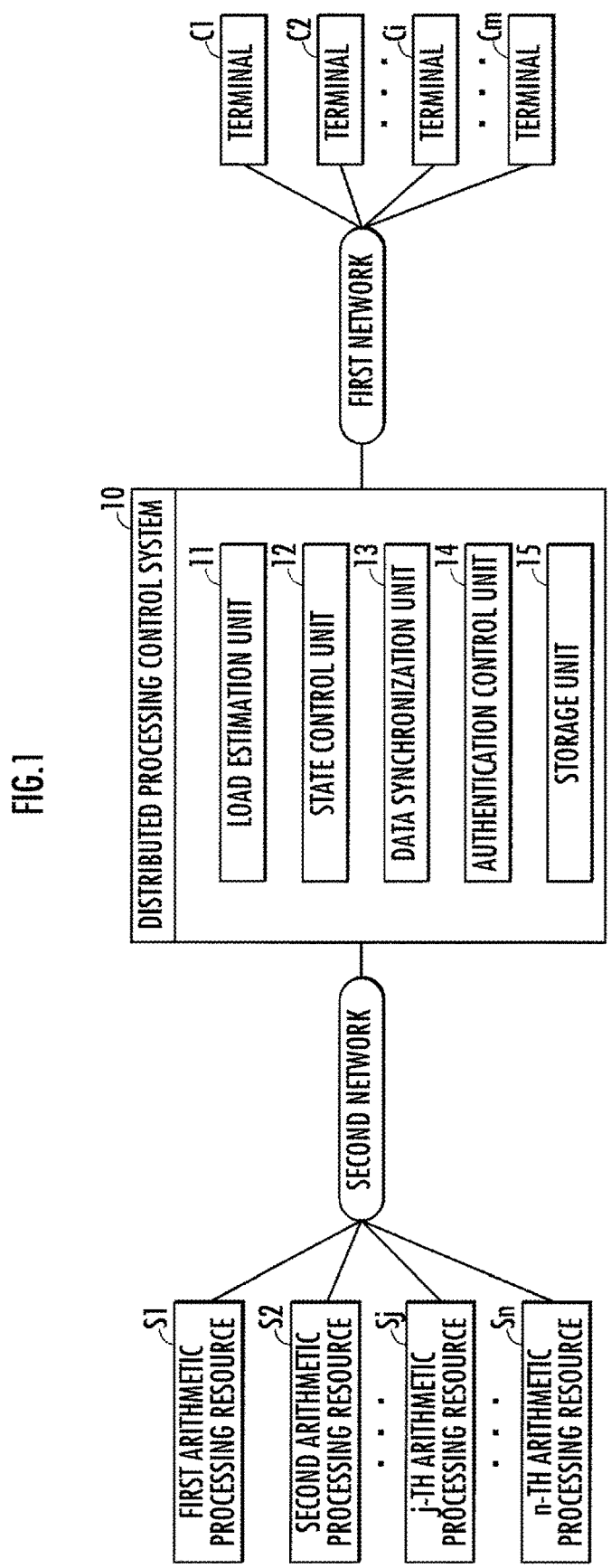
FIG. 1 is a general configuration diagram of a distributed processing control system in accordance with the present invention.

A distributed processing control system 10 illustrated in FIG. 1 is configured to allocate a request received through a first network from a plurality of terminals Ci (i=1, 2, . . . , m) to one of a plurality of arithmetic processing resources, namely, a first arithmetic processing resource S1 to an n-th arithmetic processing resource Sn, which are connected in a mutually communicable manner through a second network. At least some of the plurality of terminals Ci may constitute each arithmetic processing resource.

The first network is a wide area network, such as the Internet. The second network is, for example, a local area network. The first and the second networks may be a shared communication network.

The distributed processing control system 10 is a load balancer constituted of, for example, a computer (composed of a CPU, memories, such as a ROM and a RAM, an I/O circuit and the like). The distributed processing control system 10 includes a load estimation unit 11, which is configured to carry out the arithmetic processing to be discussed hereinafter, a state control unit 12, a data synchronization unit 13, an authentication control unit 14, and a storage unit 15.

The phrase "a constituent unit of the present invention is configured to carry out the arithmetic processing for which the constituent unit is responsible" means that an arithmetic processing device, such as a CPU or the like constituting the constituent unit, is "programmed" or "designed" to read software in addition to necessary information from a memory, such as a ROM, a RAM or the like, or a recording medium, and to carry out arithmetic processing on the information according to the software. The constituent units may be composed of a shared processor (arithmetic processing device), or each of the constituent units may be composed of a plurality of processors, which are mutually communicable.

The terminal Ci is comprised of an information terminal, such as a tablet terminal, a smartphone or a wearable terminal (e.g. watch type terminal), which is designed to have a size, a shape and a weight that enable a user to carry. The terminal Ci may be an information terminal designed to have a size and the like that make the information terminal mountable in a vehicle (e.g. a navigation device), or may be a communication device, such as a TCU or LVF.

A j-th arithmetic processing resource Sj (j=1, 2, ... , n) is a server or a virtual machine comprised of, for example, a computer (composed of a CPU, memories, such as a ROM and a RAM, an I/O circuit and the like). The j-th arithmetic processing resource Sj processes a request received from the terminal Ci and transmits, as necessary, a processing result to the terminal Ci, which is the transmission source of the request. In response to an instruction of the distributed processing control system 10, the processing for activating or deactivating the j-th arithmetic processing resource Sj (j=1, 2, ... , n) is started. In the present embodiment, a description will be given on the assumption that the processing capabilities of the arithmetic processing resources are the same. However, the processing capabilities may be different. If the processing capabilities are different, then it is necessary to make corrections obtained according to expressions (1) and (2), which will be discussed hereinafter.

The j-th arithmetic processing resource Sj constitutes "the arithmetic processing resource" in the present invention.

A request received from the terminal Ci is, for example, a route search request, which is a request for searching for a route that connects a point of departure and a destination, or a data recording request, which is a request for recording data obtained from a vehicle sensor, such as floating car data (FCD).

The phrase "one device recognizes information on the basis of the communication with another device" means to execute any type of arithmetic processing for acquiring information that involves communication. More specifically, this means that, for example, the one device receives such information from the another device, the one device performs predetermined arithmetic processing (e.g. calculation processing or search processing) on a signal received from the another device thereby to derive the information, the one device receives, from the another device, the information as the arithmetic processing result supplied by the another device, and the one device reads the information from an internal storage device or an external storage device according to the received signal.

(Load Distribution Control Processing)

Figure 2:
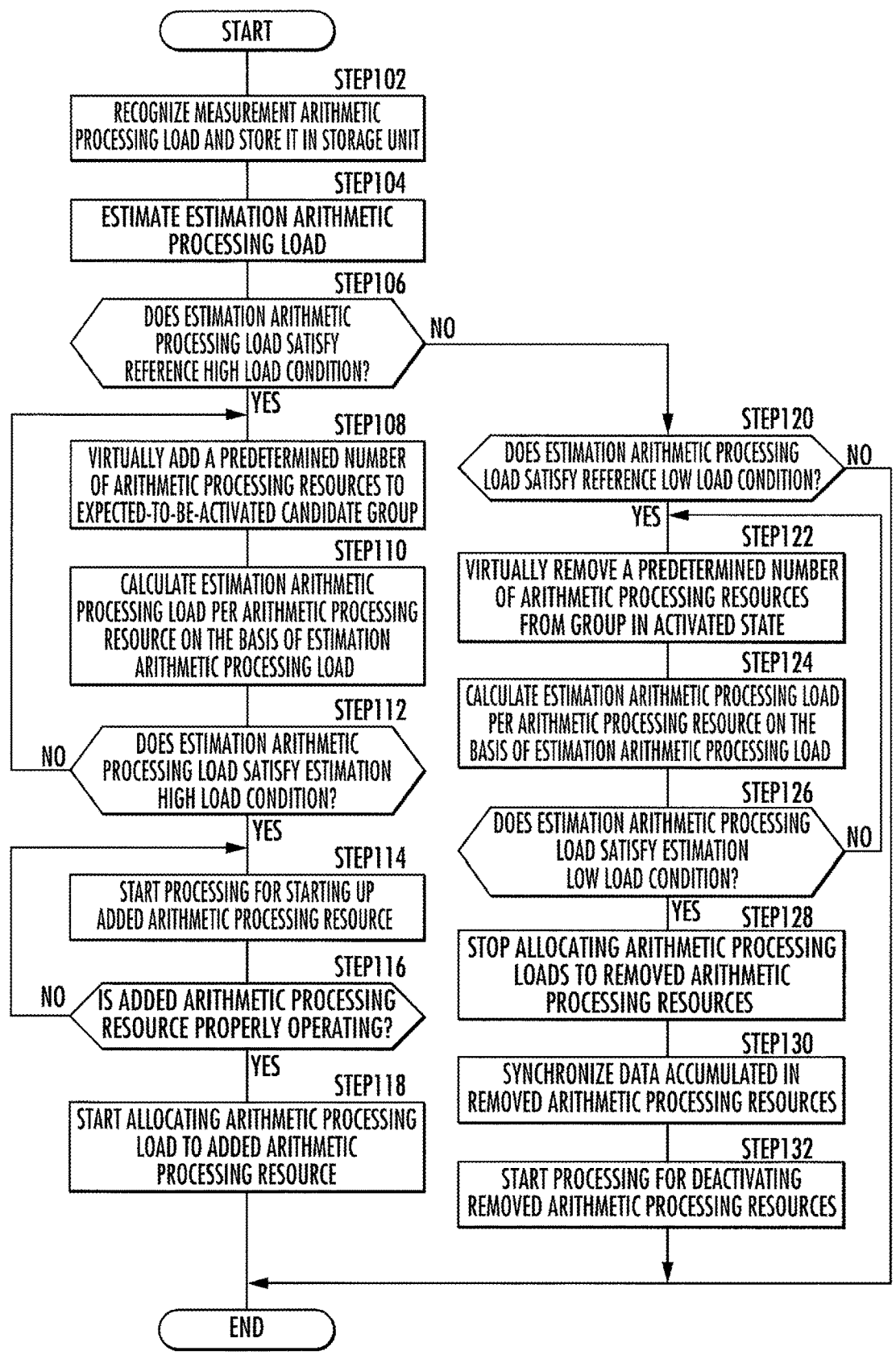
FIG. 2 is a flowchart of load distribution control processing.
Figure 3:
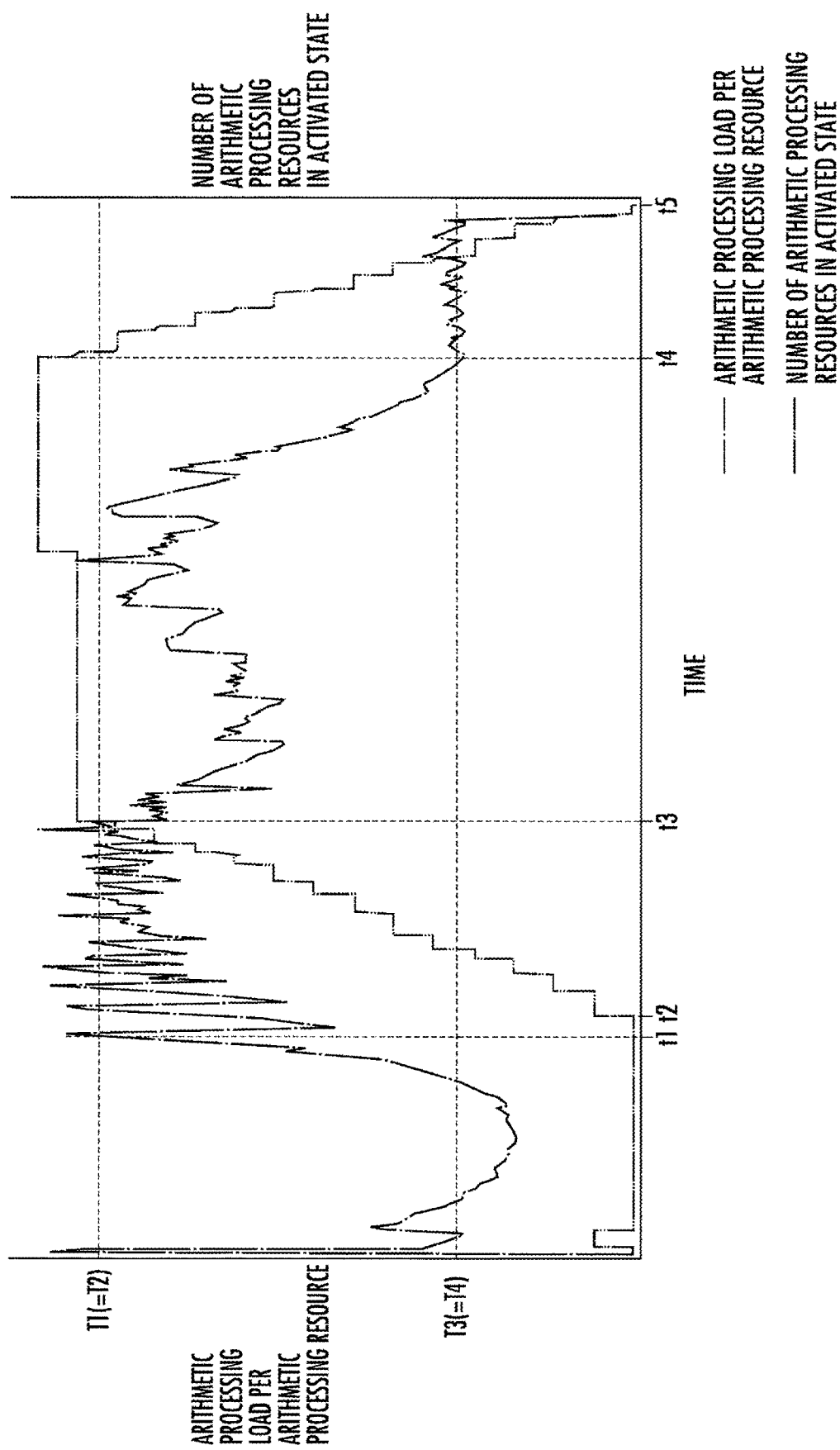
FIG. 3 is a chart illustrating the relationship between the time-series change in the arithmetic processing load per arithmetic processing resource and the time-series change in the number of arithmetic processing resources in an activated state, wherein the axis of ordinate indicates the arithmetic processing load per arithmetic processing resource or the number of arithmetic processing resources in the activated state, the axis of abscissa indicates time, the chain line graph indicates the arithmetic processing load per arithmetic processing resource, and the two-dot chain line graph indicates the number of arithmetic processing resources in the activated state.

Referring to FIG. 2 and FIG. 3, the load distribution control processing carried out by each unit of the distributed processing control system 10 will be described.

The load estimation unit 11 recognizes a measurement arithmetic processing load and stores the measurement arithmetic processing load in the storage unit 15 (STEP102 of FIG. 2).

The measurement arithmetic processing load is the arithmetic processing load, which is directly or indirectly indicated in terms of, for example, CPU utilization, memory utilization, or disc input/output (I/O) time or response time, and which is the arithmetic processing load at a reference point of time, which is the point of time of the execution of STEP102 of FIG. 2 that is required for processing a request transmitted from the terminal Ci. The measurement arithmetic processing load may be a set of a plurality of values rather than only one value. Further, the reference point of time is not limited to the point of time of the execution of STEP102 of FIG. 2, and may alternatively be a point of time that can be equivalent to STEP102 of FIG. 2 from the viewpoint of the measurement of the arithmetic processing load. For example, the measurement of the arithmetic processing load may be periodically performed and the arithmetic processing load at a latest measurement point of time may be recognized as the measurement arithmetic processing load in STEP102 of FIG. 2.

For example, the load estimation unit 11 may refer to a storage unit shared by the arithmetic processing resources Sj at regular intervals, such as every one minute, to acquire the monitoring information on the CPU utilization, the memory utilization or the disc input/output (I/O) time thereby to recognize the measurement arithmetic processing load. Further, the distributed processing control system 10 may measure the response time of each of the arithmetic processing resources Sj thereby to recognize the measurement arithmetic processing load of each of the arithmetic processing resources Sj.

The load estimation unit 11 recognizes an estimation arithmetic processing load at a first point of time in a further future than the reference point of time (e.g. five minutes after the reference point of time) (STEP104 of FIG. 2). The first point of time is preferably a point of time after which an arithmetic processing resource currently in the deactivated state is enabled to start processing. For example, if the processing for starting an arithmetic processing resource currently in the deactivated state takes three minutes, then the first point of time is preferably a point of time in three minutes or after.

The estimation arithmetic processing load at the first point of time is an estimated value of the arithmetic processing load required to process all requests from the terminals Ci at the first point of time. The estimation arithmetic processing load may take a set of a plurality of values rather than only one value, but preferably takes a value of the same form as that of the measurement arithmetic processing load.

For example, the load estimation unit 11 may estimate the estimation arithmetic processing load at the first point of time on the basis of a measurement arithmetic processing load and a first changing mode of the arithmetic processing load corresponding to the reference point of time. The first changing mode is a time-series changing mode of the past measurement arithmetic processing load of each of a plurality of element periods of time constituting a unit period of time, which is stored in the storage unit 15.

The unit period of time is, for example, one day, and the element period of time is, for example, a time in 10-minute increments. The element periods of time may alternatively be periods of time having different lengths, such as one minute, five minutes and ten minutes.

The plurality of element periods of time may overlap with each other. For example, there may be an element period of time of 9:00 to 9:10 and another element period of time of 9:05 to 9:15.

Further, the element period of time corresponding to the reference point of time means an element period of time that includes the same point of time as the reference point of time among the plurality of element periods of time. For example, if the reference point of time is 9:05 on Jun. 1, 2016, the unit period of time is one day, and the element period of time is every 10-minute period of time, then the element periods of time 8:55 to 9:05, 9:00 to 9:10, 9:05 to 9:15 and the like that include the same point of time, 9:05, as the reference point of time will be the element periods of time corresponding to the reference point of time.

If there is a plurality of element periods of time, then one may be selected from among the plurality of element periods of time; however, a reference point of time that will be the start timing of an element period of time is preferably selected.

The first changing mode is indicated by a past measurement arithmetic processing load in terms of a value for each element period of time (e.g. 9:00 to 9:10).

For example, the first changing mode may alternatively be indicated by the amount of an increase or a decrease in each measurement arithmetic processing load for each element period of time, such as a 10% increase in the measurement arithmetic processing load in the element period of time 9:00 to 9:10. In this case, the load estimation unit 11 may use, as the estimation arithmetic processing load at the first point of time, the value obtained by adding the amount of an increase or a decrease in the measurement arithmetic processing load in the element period of time corresponding to the reference point of time indicated in the first changing mode and the measurement arithmetic processing load recognized in STEP102 of FIG. 2.

Further, for example, the first changing mode may be indicated by the average value of the arithmetic processing load at each time in an element period of time, such as the average value of the arithmetic processing load at 9:00 being 50%, the average arithmetic processing load at 9:01 being 52%, . . . , and the average value of the arithmetic processing load at 9:10 being 60%. In this case, the load estimation unit 11 may determine, as the estimation arithmetic processing load at the first point of time, a value obtained by adding the difference between a measurement arithmetic processing load and the average value of the arithmetic processing loads at the reference point of time to the average value of the arithmetic processing load at the time corresponding to the first point of time indicated in the first changing mode.

In addition to or in place of the above, the load estimation unit 11 may recognize a second changing mode of the arithmetic processing load corresponding to the reference point of time and may estimate the estimation arithmetic processing load at the first point of time on the assumption that a changing mode having the degree of approximation thereof to the second changing mode being a predetermined value or more will take place during a period of time from the reference point of time to the first point of time.

The second changing mode is a time-series changing mode of the measurement arithmetic processing loads from a second point of time that is further past than the reference point of time (e.g. five minutes before the reference point of time) to the reference point of time, which is stored in the storage unit 15. The interval from the second point of time to the reference point of time and the interval from the reference point of time to the first point of time may differ, but are preferably the same.

For example, the second changing mode may be indicated by the amount of an increase or a decrease in each measurement arithmetic processing load in a period of time from the second point of time to the reference point of time, such as an increase of 10% in the measurement arithmetic processing load in the period of time from the second point of time to the reference point of time. In this case, the amount of an increase or a decrease, the degree of approximation of which to the amount of an increase or a decrease in the measurement arithmetic processing load in the period of time from the second point of time to the reference point of time is a predetermined value or more, takes a value obtained by, for example, multiplying the amount of an increase or a decrease in the measurement arithmetic processing load in the period of time from the second point of time to the reference point of time by a predetermined coefficient (e.g. a coefficient included in the range of 0.5 to 2). The load estimation unit 11 may determine, as the estimation arithmetic processing load at the first point of time, the value obtained by adding the value determined as described above and the measurement arithmetic processing load recognized in STEP102 of FIG. 2.

If the interval from the second point of time to the reference point of time and the interval from the reference point of time to the first point of time are different, then the load estimation unit 11 may recognize the estimation arithmetic processing load at the first point of time by using a value obtained by dividing the amount of an increase or a decrease of each measurement arithmetic processing load in the period of time from the second point of time to the reference point of time by the ratio between the interval from the second point of time to the reference point of time and the interval from the reference point of time to the first point of time.

Further, in addition to or in place of the above, the load estimation unit 11 may estimate the estimation arithmetic processing load at the first point of time on the basis of the third changing mode of the arithmetic processing load and the fourth changing mode of the arithmetic processing load.

The third changing mode is a time-series changing mode of past arithmetic processing loads stored in the storage unit 15. Further, the fourth changing mode is a time-series changing mode of arithmetic processing loads from a third point of time that is further past than the reference point of time to the reference point of time (e.g. five minutes before).

For example, the third changing mode may be indicated by the measurement arithmetic processing load at each time, such as the measurement arithmetic processing load at 9:00 on May 1, 2016 being 50%, the measurement arithmetic processing load at 9:01 on May 1, 2016 being 52%, . . . , and the measurement arithmetic processing load at 9:10 on May 1, 2016 being 60%.

Further, the fourth changing mode is indicated by data in the same format as that of the third changing mode, such as the measurement arithmetic processing load at the third point of time being 48% . . . . , and the measurement arithmetic processing load at the reference point of time being 58%.

The load estimation unit 11 may recognize the third changing mode, which is a changing mode, the approximation thereof to the fourth changing mode being a predetermined degree or more, and may estimate the estimation arithmetic processing load at the first point of time on the basis of a changing mode that follows the third changing mode. Further, if there is a plurality of the third changing modes, the approximation thereof to the fourth changing mode being a predetermined degree or more, then a third changing mode having higher freshness (newer) is preferably adopted.

The load estimation unit 11 may determine an estimation arithmetic processing load on the basis of the foregoing plurality of values. For example, the load estimation unit 11 may determine, as the value of an estimation arithmetic processing load, the average value of an estimated value based on the first changing mode and an estimated value based on the second changing mode.

Further, in addition to the above, the load estimation unit 11 may be configured to recognize a bias period of time, in which an arithmetic processing load is increased or decreased, and to recognize an estimation arithmetic processing load according to the amount of an increase or a decrease in the bias period of time if the reference point of time is included in the bias period of time.

For example, the bias period of time is a period of time, such as a weekend, a national holiday, the Obon festival, a long holiday (e.g. the New Year holiday), or the rainy season, in which the usage frequency of vehicles increases, or a period of time, such as a snow season, when the usage frequency of vehicles decreases. During such a bias period of time, the number of received requests, such as the request for searching for a route, increases or decreases according to an increase or a decrease in the usage frequency of vehicles, resulting in an increase or a decrease in the arithmetic processing load required for processing the requests. Thus, in the case where the first point of time is included in the bias period of time, the estimation arithmetic processing load may be corrected by multiplying the estimation arithmetic processing load determined as described above by a preset coefficient associated with the amount of an increase or a decrease in the bias period of time.

The state control unit 12 determines whether the estimation arithmetic processing load satisfies a reference high load condition (STEP106 of FIG. 2).

The reference high load condition is a condition in which the estimation arithmetic processing load (e.g. the CPU utilization) per arithmetic processing resource Sj in the activated state exceeds a predetermined reference high load threshold value T1 (e.g. 60%) illustrated in FIG. 3.

If an estimation arithmetic processing load is a set of a plurality of values, then the reference high load condition may be a condition in which each of the values exceeds the high load threshold value T1, or a condition in which the statistical value, such as the average value, of the plurality of values exceeds the high load threshold value T1, or a condition in which any one or all of the plurality of values exceed a high load threshold value provided for each set of a plurality of values. The same condition applies to other conditions. The reference high load condition corresponds to an example of "the second condition" in the present invention, and the high load threshold value T1 corresponds to the upper limit value of "the predetermined range" of the "second condition" in the present invention.

For example, at time t1 in FIG. 3, the estimation arithmetic processing load per arithmetic processing resource Sj in the activated state, which is indicated by the chain line, exceeds the reference high load threshold value T1. Therefore, the determination result in STEP106 of FIG. 2 is affirmative.

Further, if the estimation arithmetic processing load continuously satisfies the reference high load condition for a certain time (e.g. five minutes), then the load estimation unit 11 may decide that the determination result in STEP106 of FIG. 2 is affirmative.

If the determination result in STEP106 of FIG. 2 is affirmative (YES in STEP106 of FIG. 2), then the state control unit 12 virtually adds a predetermined number (e.g. two) of arithmetic processing resources in the deactivated state to an expected-to-be-activated candidate group, which is a group of candidate arithmetic processing resources expected to be activated (STEP108 of FIG. 2). The state control unit 12 may add, in place of or in addition to the arithmetic processing resources in the deactivated state, the arithmetic processing resources which are currently in the activated state and to which no arithmetic processing load is currently allocated.

At the beginning of STEP108 of FIG. 2, the expected-to-be-activated candidate group is comprised of arithmetic processing resources in the activated state at the reference point of time. At the beginning of STEP108 of FIG. 2, in the case where an sp1 number of arithmetic processing resources is in the activated state, if, for example, an sp2 number of arithmetic processing resources in the deactivated state are virtually added to the expected-to-be-activated candidate group, then the expected-to-be-activated candidate group will include a total of sp1+sp2 of arithmetic processing resources.

Based on an estimation arithmetic processing load, the state control unit 12 calculates the estimation arithmetic processing load per arithmetic processing resource included in the expected-to-be-activated candidate group at the first point of time (STEP110 of FIG. 2).

For example, the state control unit 12 may determine an estimation arithmetic processing load PL1 per arithmetic processing resource included in the expected-to-be-activated candidate group according to expression (1) given below.

$$PL1 = \frac{PL0}{sp1 + sp2 * sc} \quad (1)$$

PL0 denotes a value obtained by adding a predetermined control value to an estimation arithmetic processing load estimated in STEP104 of FIG. 2, sp1 denotes the number of the arithmetic processing resources in the activated state at the reference point of time, sp2 denotes the number of virtually added arithmetic processing resources, and sc denotes a coefficient which takes a value that is larger than zero and one or less (preferably below one), and the added number of the arithmetic processing resources sp2 is multiplied by this coefficient. A predetermined coefficient sc below one is a coefficient for indicating the estimation processing capacity of an arithmetic processing resource having a processing capacity that is lower than a normal processing capacity in the case where, for example, an arithmetic processing resource cannot fully display its arithmetic performance for initial setting or synchronization processing or the like immediately after its startup.

The state control unit 12 determines whether the estimation arithmetic processing load satisfies the estimation high load condition (STEP112 of FIG. 2).

The estimation high load condition is a condition in which the estimation arithmetic processing load PL1 (e.g. the CPU utilization) per arithmetic processing resource of the expected-to-be-activated candidate group is equal to or less than a predetermined estimation high load threshold value T2 (e.g. 60%) illustrated in FIG. 3. The estimation high load threshold value T2 is preferably the same value as the reference high load threshold value T1, but may be a different value from the reference high load threshold value T1.

If the determination result in STEP112 of FIG. 2 is negative (NO in STEP112 of FIG. 2), that is, if the estimation arithmetic processing load PL1 per arithmetic processing resource of the expected-to-be-activated candidate group exceeds the estimation high load threshold value T2, then the state control unit 12 carries out the processing of STEP108 and after of FIG. 2 again. Prior to the processing in STEP108 of FIG. 2, if the state control unit 12 performs a simulation in which a quicker start of an arithmetic processing resource is performed by advancing the start timing of the startup processing of the arithmetic processing resource or by omitting a part of the initial setting, and if the simulation causes the determination result in STEP112 of FIG. 2 to be affirmative, then the state control unit 12 may proceed to STEP114 of FIG. 2 without carrying out the processing of STEP108 and after of FIG. 2.

If the determination result in STEP112 of FIG. 2 is affirmative (YES in STEP112 of FIG. 2), that is, if the estimation arithmetic processing load PL1 per arithmetic processing resource of the expected-to-be-activated candidate group is equal to or less than the estimation high load threshold value T2, then the state control unit 12 starts the processing for activating an added arithmetic processing resource (STEP114 of FIG. 2).

The state control unit 12 determines whether the added arithmetic processing resource is normally operating (STEP116 of FIG. 2), and if the added arithmetic processing resource is not normally operating (NO in STEP116 of FIG. 2), then the state control unit 12 carries out the processing of STEP114 of FIG. 2 again.

If the added arithmetic processing resource is normally operating (YES in STEP116 of FIG. 2), then the state control unit 12 starts to allocate the arithmetic processing load to the added arithmetic processing resource (to transfer a request received from the terminal Ci) (STEP118 of FIG. 2).

If the determination result in STEP106 of FIG. 2 is negative (NO in STEP106 of FIG. 2), then the state control unit 12 determines whether the estimation arithmetic processing load satisfies a reference low load condition (STEP120 of FIG. 2).

The reference low load condition is a condition in which the estimation arithmetic processing load (e.g. the CPU utilization) per arithmetic processing resource Sj in the activated state is equal to or smaller than a predetermined reference low load threshold value T3 (e.g. 20%), as illustrated in FIG. 3. The reference low load condition corresponds to an example of "the second condition" in the present invention, and the reference low load threshold value T3 corresponds to the lower limit value of "the predetermined range" of "the second condition" in the present invention.

For example, at time t4 in FIG. 3, the estimation arithmetic processing load per arithmetic processing resource Sj in the activated state, which is indicated by the chain line, is the reference low load threshold value T3 or less. Hence, the determination result in STEP120 of FIG. 2 is affirmative.

Further, if the estimation arithmetic processing load continuously satisfies the reference low load condition for a certain time (e.g. five minutes), then the state control unit 12 may determine that the determination result in STEP120 of FIG. 2 is affirmative.

If the determination result in STEP120 of FIG. 2 is negative (NO in STEP120 of FIG. 2), then the state control unit 12 terminates the load distribution control processing of the present cycle.

If the determination result in STEP120 of FIG. 2 is affirmative (YES in STEP120 of FIG. 2), then the state control unit 12 virtually removes a predetermined number of (e.g. two) arithmetic processing resources from the group in the activated state, which is the group of the arithmetic processing resources in the activated state (STEP122 of FIG. 2).

At the beginning of STEP122 of FIG. 2, in the case where the sp1 number of arithmetic processing resource is in the activated state, if, for example, the sp3 number of arithmetic processing resources in the activated state is virtually removed from the group in the activated state, then the group in the activated state will include the sp1−sp3 number of arithmetic processing resources in total.

Based on the estimation arithmetic processing load, the state control unit 12 calculates the estimation arithmetic processing load per arithmetic processing resource included in the group in the activated state at the first point of time (STEP124 of FIG. 2).

For example, the state control unit 12 may determine the estimation arithmetic processing load PL2 per arithmetic processing resource included in the group in the activated state according to expression (2) given below.

$$PL2 = \frac{PL0}{sp1 - sp3} \quad (2)$$

PL0 denotes a value obtained by adding a predetermined control value to an estimation arithmetic processing load estimated in STEP104 of FIG. 2, sp1 denotes the number of the arithmetic processing resources in the activated state at the reference point of time, and sp3 denotes the number of the arithmetic processing resources that have virtually been removed.

The state control unit 12 determines whether the estimation arithmetic processing load satisfies the estimation low load condition (STEP126 of FIG. 2).

The estimation low load condition is a condition in which the estimation arithmetic processing load PL2 (e.g. the CPU utilization) per arithmetic processing resource of the expected-to-be-activated candidate group is equal to or larger than a predetermined estimation low load threshold value T4 (e.g. 20%) illustrated in FIG. 3. The estimation low load threshold value T4 is preferably the same value as the reference low load threshold value T3, but may be a different value from the reference low load threshold value T3. The estimation low load condition corresponds to an example of "the first condition" in the present invention.

If the determination result in STEP126 of FIG. 2 is negative (NO in STEP126 of FIG. 2), that is, if the estimation arithmetic processing load PL2 per arithmetic processing resource of the expected-to-be-activated candidate group, is below the estimation low load threshold value T4, then the state control unit 12 carries out the processing of STEP122 and after of FIG. 2 again.

If the determination result in STEP126 of FIG. 2 is affirmative (YES in STEP126 of FIG. 2), that is, if the estimation arithmetic processing load PL2 per arithmetic processing resource of the expected-to-be-activated candidate group is equal to or larger than the estimation low load threshold value T4, then the state control unit 12 suspends the allocation of the arithmetic processing load to the removed arithmetic processing resources (STEP128 of FIG. 2).

The data synchronization unit 13 synchronizes the data accumulated in the removed arithmetic processing resources and stores the data in the storage unit 15 (STEP130 of FIG. 2). The data includes the authentication information of the terminal Ci that is a request transmission source.

The state control unit 12 starts the processing for deactivating the removed arithmetic processing resources (STEP132 of FIG. 2).

(Operation and Effect of the Load Distribution Processing)

According to the load distribution processing, as illustrated in FIG. 3, even if the estimation arithmetic processing load exceeds the reference high load threshold value T1 at time t1, the processing for activating the arithmetic processing resources is started such that the estimation arithmetic processing load becomes equal to or less than the estimation high load threshold value T2, thus causing a proper number of the arithmetic processing resources to be activated (to process a request) at time t2. Thus, even if, for example, a sudden increase in the arithmetic processing load takes place at times t1 to t3, as illustrated, a proper number of the arithmetic processing resources will be added as needed, thus making it possible to prevent excess arithmetic processing load from being applied to the arithmetic processing resources.

Further, according to the load distribution processing, as illustrated in FIG. 3, even if the estimation arithmetic processing load becomes equal to or smaller than the reference low load threshold value T3 at time t4, the arithmetic processing resources are deactivated such that the estimation arithmetic processing load becomes equal to or more than the estimation low load threshold value T4, thus causing a proper number of the arithmetic processing resources to be activated at time t5. With this arrangement, even when the arithmetic processing resources are deactivated at, for example t4 to t5, as illustrated, the arithmetic processing load will be properly allocated to the remaining arithmetic processing resources.

Further, during the period from time t3 to t4, excess load to each arithmetic processing resource or surplus processing capacity is suppressed.

(Startup Processing)

Referring now to FIG. 4, a description will be given of the startup flow of an arithmetic processing resource when the startup processing is initiated in STEP114 of FIG. 2.

When the supply of power is started in response to a startup instruction from the distributed processing control system 10, the arithmetic processing resource performs initial processing, including BIOS setting and OS setting (STEP202 of FIG. 4).

The arithmetic processing resource determines whether the setting information has been synchronized within a predetermined time (STEP204 of FIG. 4).

If the determination result is negative (NO in STEP204 of FIG. 4), then the arithmetic processing resource performs the synchronization of the setting information (STEP206 of FIG. 4).

If the determination result is affirmative (YES in STEP204 of FIG. 4) or after the processing in STEP206 of FIG. 4, the arithmetic processing resource verifies whether a communication function, an arithmetic processing function and the like are properly operating (STEP208 of FIG. 4). If a function that is not properly operating is found, then the arithmetic processing resource transmits an error message to the distributed processing control system 10 and restarts the function or restarts itself to secure the normal operation of each function.

After STEP208 of FIG. 4, the arithmetic processing resource starts the processing of an arithmetic processing load (a request received from the terminal Ci) allocated thereto in STEP118 of FIG. 2 (STEP210 of FIG. 4).

The processing described above makes it possible to properly omit the synchronization processing and to also properly start up the arithmetic processing resource.

(Request Acceptance Processing)

Referring now to FIG. 5, a description will be given of the processing flow in the case where the distributed processing control system 10 receives a request from the terminal Ci.

Upon receipt of a new request from the terminal Ci (STEP302 of FIG. 5), the authentication control unit 14 determines whether a request has been received from the terminal Ci which is the transmission source of the new request within a predetermined time from the point of time of receiving the new request (STEP304 of FIG. 5). The authentication control unit 14 carries out the determination in STEP304 of FIG. 5 on the basis of, for example, the log information in the storage unit 15.

If the determination result is negative (NO in STEP304 of FIG. 5), then the authentication control unit 14 connects the terminal Ci to an appropriate information processing resource (STEP306 of FIG. 5). The authentication of the terminal Ci is performed by the connected information processing resource, and the authentication information is created.

If the determination result is affirmative (YES in STEP304 of FIG. 5), then the authentication control unit 14 refers to the log information stored in the storage unit 15 thereby to determine whether an arithmetic processing resource in the deactivated state has processed a previous request of the terminal Ci (STEP308 of FIG. 5).

If the determination result is negative (NO in STEP308 of FIG. 5), then the authentication control unit 14 connects the information processing resource that has processed the previous request of the terminal Ci and the terminal Ci (STEP310 of FIG. 5).

If the determination result is affirmative (YES in STEP308 of FIG. 5), then the authentication control unit 14 refers to the storage unit 15 to search for the data synchronized in STEP130 of FIG. 2, thereby recognizing the authentication information of the terminal Ci (STEP312 of FIG. 5).

After STEP312 of FIG. 5, the authentication control unit 14 transmits, together with a new request, the authentication information of the terminal Ci to an appropriate information processing resource, and connects the terminal Ci and the information processing resource (STEP314 of FIG. 5).

With the processing described above, even if the arithmetic processing resource that has processed a previous request is in the deactivated state, the authentication of a terminal is performed using the authentication information included in the data synchronized when the arithmetic processing resource is placed in the deactivated state. This enables the communication of authentication to be omitted, thus permitting a reduction in arithmetic processing load.

DESCRIPTION OF REFERENCE NUMERALS

10 . . . Distributed processing control system; 11 . . . Load estimation unit; 12 . . . State control unit; and Sj . . . Arithmetic processing resource

What is claimed is:

1. A distributed processing control system that controls a switching of an operation state of each of a plurality of arithmetic processing resources that carry out arithmetic processing, comprising:
   a processor; and
   at least one memory including computer program code, wherein the at least one memory and the computer program code are configured to, with the processor, cause the distributed processing control system at least to
   estimate an estimation arithmetic processing load, which is an arithmetic processing load on all the plurality of arithmetic processing resources at a first point of time in a future from a reference point of time; and
   start a processing for switching an operation state of the arithmetic processing resources before the first point of time so as to satisfy a first condition, in which the estimation arithmetic processing load is included in a predetermined range of an estimation processing capacity of an arithmetic processing resource expected to be activated at the first point of time, wherein the first condition includes an estimation high load condition, in which the estimation arithmetic processing load is equal to or less than an estimation high load threshold value, which is an upper limit value of the predetermined range, wherein the at least one memory and the computer program code are further configured to, with the processor, cause the distributed processing control system to determine the arithmetic processing resource expected to be activated by virtually adding an arithmetic processing resource to an arithmetic processing resource in an activated state until the estimation arithmetic processing load satisfies the estimation high load condition, and evaluate the estimation processing capacity of the virtually added arithmetic processing resource at the first point of time to be lower than a normal processing capacity of the virtually added arithmetic processing resource, and wherein the estimation high load condition is a condition, in which a ratio of the estimation arithmetic processing load to a sum of a processing capacity of the arithmetic processing resource in the activated state and the estimation processing capacity of the virtually added arithmetic processing resource is equal to or less than the estimation high load threshold value.

2. The distributed processing control system according to claim 1, wherein the first condition includes an estimation low load condition, in which the estimation arithmetic processing load is equal to or more than an estimation low load threshold value, which is a lower limit value of the predetermined range, and wherein the at least one memory and the computer program code are further configured to, with the processor, cause the distributed processing control system to determine the arithmetic processing resource expected to be activated by virtually reducing the number of the arithmetic processing resources in the activated state until the estimation arithmetic processing load satisfies the estimation low load condition.

3. The distributed processing control system according to claim 1, wherein in a case where the number of the arithmetic processing resources expected to be activated at the first point of time is smaller than the number of the arithmetic processing resources in the activated state at the reference point of time, the at least one memory and the computer program code are further configured to, with the processor, cause the distributed processing control system to start, by the first point of time, a processing for deactivating arithmetic processing resources that are different from the arithmetic processing resources expected to be activated among the arithmetic processing resources in the activated state, and in a case where the number of the arithmetic processing resources expected to be activated at the first point of time is larger than the number of the arithmetic processing resources in the activated state at the reference point of time, the at least one memory and the computer program code are further configured to, with the processor, cause the distributed processing control system to start, by the first point of time, a processing for activating the arithmetic processing resources in a deactivated state by a number equivalent to a difference between the number of the arithmetic processing resources expected to be activated at the first point of time and the number of the arithmetic processing resources in the activated state among the plurality of arithmetic processing resources.

4. The distributed processing control system according to claim 3, wherein each of the plurality of arithmetic processing resources is an arithmetic processing resource that processes a request from an authenticated terminal, and wherein the at least one memory and the computer program code are further configured to, with the processor, cause the distributed processing control system to:

acquire, from one arithmetic processing resource, data which is accumulated in the one arithmetic processing resource at a time of deactivating the one arithmetic processing resource among the plurality of arithmetic processing resources and which includes authentication information of the terminal, and include a data synchronization element that transmits the authentication information, which is included in the data, together with a second request to an arithmetic processing resource in the activated state or expected to be activated at a point of time of processing the second request in a case where the second request is newly received from a terminal that has accepted a first request within a predetermined time from the reference point of time and the arithmetic processing resource that has processed the first request is deactivated.

5. The distributed processing control system according to claim 1, wherein the at least one memory and the computer program code are further configured to, with the processor, cause the distributed processing control system to start a processing for selecting an arithmetic processing resource that satisfies the first condition provided that a second condition is satisfied in which the estimation arithmetic processing load deviates from a predetermined range of the processing capacity of an arithmetic processing resource in the activated state at the reference point of time.

6. The distributed processing control system according to claim 1, wherein the at least one memory and the computer program code are further configured to, with the processor, cause the distributed processing control system to:

store a third changing mode, which is a time-series changing mode of a past arithmetic processing load; and recognize a fourth changing mode, which is a time-series changing mode of an arithmetic processing load up to the reference point of time from a third point of time that is further in the past than the reference point of time, and to estimate the estimation arithmetic processing load based on the third changing mode, a degree of approximation thereof to the fourth changing mode being a predetermined value or more.

7. The distributed processing control system according to claim 6, wherein the at least one memory and the computer program code are further configured to, with the processor, cause the distributed processing control system to estimate the estimation arithmetic processing load based on a third changing mode having freshness of a predetermined value or more among the third changing modes, the degrees of approximation thereof to the fourth changing mode being a predetermined value or more.

8. The distributed processing control system according to claim 5,
wherein the at least one memory and the computer program code are further configured to, with the processor, cause the distributed processing control system to
recognize a bias period of time, in which the arithmetic processing load is increased or decreased, and
recognize the estimation arithmetic processing load according to an amount of an increase or a decrease in the bias period of time in a case where the reference point of time is included in the bias period of time.

9. A distributed processing control system that controls a switching of an operation state of each of a plurality of arithmetic processing resources that carry out arithmetic processing, comprising:
a processor; and
at least one memory including computer program code,
wherein the at least one memory and the computer program code are configured to, with the processor, cause the distributed processing control system at least to
estimate an estimation arithmetic processing load, which is an arithmetic processing load on all the plurality of arithmetic processing resources at a first point of time in a future from a reference point of time;
start a processing for switching an operation state of the arithmetic processing resources before the first point of time so as to satisfy a first condition, in which the estimation arithmetic processing load is included in a predetermined range of an estimation processing capacity of an arithmetic processing resource expected to be activated at the first point of time;
store a first changing mode, which is a time-series changing mode of a past arithmetic processing load for each of a plurality of element periods of time constituting a predetermined unit period of time; and
measure a measurement arithmetic processing load, which is the arithmetic processing load at the reference point of time and to estimate the estimation arithmetic processing load based on the measurement arithmetic processing load and the first changing mode in the element period of time corresponding to the reference point of time.

10. A distributed processing control system that controls a switching of an operation state of each of a plurality of arithmetic processing resources that carry out arithmetic processing, comprising:
a processor; and
at least one memory including computer program code,
wherein the at least one memory and the computer program code are configured to, with the processor, cause the distributed processing control system at least to
estimate an estimation arithmetic processing load, which is an arithmetic processing load on all the plurality of arithmetic processing resources at a first point of time in a future from a reference point of time;
start a processing for switching an operation state of the arithmetic processing resources before the first point of time so as to satisfy a first condition, in which the estimation arithmetic processing load is included in a predetermined range of an estimation processing capacity of an arithmetic processing resource expected to be activated at the first point of time;
recognize a second changing mode, which is a time-series changing mode of an arithmetic processing load up to the reference point of time from a second point of time that is further in the past than the reference point of time; and
estimate the estimation arithmetic processing load on an assumption that a changing mode, a degree of approximation thereof to the second changing mode being a predetermined value or more, takes place during a period of time from the reference point of time to the first point of time.

11. A distributed processing control method for controlling a switching of an operation state of each of a plurality of arithmetic processing resources that carry out arithmetic processing, comprising:
a load estimation step of estimating an estimation arithmetic processing load, which is an arithmetic processing load on all the plurality of arithmetic processing resources at a first point of time in a future from a reference point of time; and
a state control step of starting the processing for switching the operation states of the arithmetic processing resources before the first point of time so as to satisfy a first condition, in which the estimation arithmetic processing load is included in a predetermined range of an estimation processing capacity of an arithmetic processing resource expected to be activated at the first point of time,
wherein the first condition includes an estimation high load condition, in which the estimation arithmetic processing load is equal to or less than an estimation high load threshold value, which is an upper limit value of the predetermined range,
wherein the state control step further comprises
determining the arithmetic processing resource expected to be activated by virtually adding an arithmetic processing resource to an arithmetic processing resource in an activated state until the estimation arithmetic processing load satisfies the estimation high load condition, and
evaluating the estimation processing capacity of the virtually added arithmetic processing resource at the first point of time to be lower than a normal processing capacity of the virtually added arithmetic processing resource, and
wherein the estimation high load condition is a condition, in which a ratio of the estimation arithmetic processing load to a sum of a processing capacity of the arithmetic processing resource in the activated state and the estimation processing capacity of the virtually added arithmetic processing resource is equal to or less than the estimation high load threshold value.

* * * * *